United States Patent
Quakkelaar et al.

(10) Patent No.: US 9,607,068 B2
(45) Date of Patent: Mar. 28, 2017

(54) PARALLEL TRUNCATION POINT MANAGEMENT FOR LOG BASED REPLICATION

(71) Applicants: Rene Quakkelaar, Walldorf (DE); Martin Pieczonka, Walldorf (DE); Elena Lora, Walldorf (DE)

(72) Inventors: Rene Quakkelaar, Walldorf (DE); Martin Pieczonka, Walldorf (DE); Elena Lora, Walldorf (DE)

(73) Assignee: SYBASE, INC., Dublin, CA (US)

(*) Notice: Subject to any disclaimer, the term of this patent is extended or adjusted under 35 U.S.C. 154(b) by 200 days.

(21) Appl. No.: 14/102,709

(22) Filed: Dec. 11, 2013

(65) Prior Publication Data

US 2015/0112929 A1 Apr. 23, 2015

Related U.S. Application Data

(60) Provisional application No. 61/892,566, filed on Oct. 18, 2013.

(51) Int. Cl.
*G06F 7/02* (2006.01)
*G06F 17/30* (2006.01)

(52) U.S. Cl.
CPC .. *G06F 17/30581* (2013.01); *G06F 17/30194* (2013.01); *G06F 17/30215* (2013.01); *G06F 17/30368* (2013.01); *G06F 17/30575* (2013.01)

(58) Field of Classification Search
CPC .......... G06F 17/30575; G06F 11/1471; G06F 17/30194; G06F 17/30215; G06F 3/065
See application file for complete search history.

(56) References Cited

U.S. PATENT DOCUMENTS

| | | | | |
|---|---|---|---|---|
| 7,228,452 B2* | 6/2007 | Moser | ..................... | G06F 9/526 714/12 |
| 8,296,536 B2* | 10/2012 | Akirav | ................ | G06F 11/1456 711/111 |
| 2006/0053121 A1* | 3/2006 | Zizys | .................. | G06F 11/1451 |
| 2006/0053181 A1* | 3/2006 | Anand | ................ | G06F 11/0715 |
| 2006/0235909 A1* | 10/2006 | Oks | ...................... | G06F 11/1471 |
| 2010/0191884 A1* | 7/2010 | Holenstein | .......... | G06F 11/2094 710/200 |

(Continued)

*Primary Examiner* — Bruce Moser
(74) *Attorney, Agent, or Firm* — Sterne, Kessler, Goldstein and Fox P.L.L.C.

(57) ABSTRACT

Disclosed herein are system, method, and computer program product embodiments for replicating data in a distributed database system. Data containing a replicated truncation point associated with a replicating system is received via a data path. It can then be determined that the truncation point represents the point at which all data in a transaction log has been replicated (e.g., successfully or safely) and the transaction log can then be truncated at the truncation point (i.e., the data up to the truncation point deflected). Data containing an additional replicated truncation point associated with an additional replicating system via an additional data path may be received. It can then be determined that the additional replicated truncation point represents the point at which all data in the transaction log has been replicated and the transaction log can be then truncated at the additional replicated truncation point.

22 Claims, 8 Drawing Sheets

(56) References Cited

U.S. PATENT DOCUMENTS

2011/0225359 A1* 9/2011 Kulkarni ............... G06F 3/0607
  711/114
2012/0150803 A1* 6/2012 Zhu ................... G06F 17/30575
  707/638

* cited by examiner

PARALLEL TRUNCATION POINT MANAGEMENT FOR LOG BASED REPLICATION

CROSS-REFERENCE TO RELATED APPLICATION

The present application is a non-provisional application claiming priority to provisional U.S. Patent Application No. 61/892,566, which was filed on Oct. 18, 2013, and is herein incorporated by reference in its entirety.

BACKGROUND

In distributed database systems, changes in a primary database need to be replicated to one or more target databases in order to maintain data integrity across the entire system. A common way to accomplish the replication is to record the changes made to the primary database in a transaction log and then replicate the recorded changes to the target databases using replication systems. Once the recorded changes have been safely replicated from the transaction log to the replication systems, they can be deleted, or truncated, from the transaction log to free up space in the transaction log for recording additional changes in the primary database.

A problem can arise in this arrangement, however, when the transaction log data is replicated to multiple replication systems via multiple parallel paths. For instance, assume that transaction log data needs to be replicated to both a first replication system and a second replication system using first and second paths. Invariably, there will be differences in the times it takes to transmit the data via the different paths and differences in times it takes for the replication systems to process the data. What these (and other) differences between the two paths means is that it is possible for the transaction log data to have been successfully replicated to the first replication system but not yet to the second replication system and vice versa. Thus, it may be safe to truncate the transaction log with respect to one of the replicating systems, but not the other. As such, it can be difficult to determine when the transaction log data can be properly truncated from the transaction log.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, that embody new and inventive ways of replicating data from a primary database to one or more target databases via replicating systems.

For instance, according to various embodiments, a method for replication is provided. According to the method, data containing a replicated truncation point associated with a replicating system is received via a data path. It can then be determined that the truncation point represents the point at which all data in a transaction log has been replicated (e.g., successfully or safely) and the transaction log can then be truncated at the truncation point (i.e., the data up to the truncation point deflected). According to some embodiments, the method may include receiving data containing an additional replicated truncation point associated with an additional replicating system via an additional data path. It can then be determined that the additional replicated truncation point represents the point at which all data in the transaction log has been replicated and the transaction log can be then truncated at the additional replicated truncation point.

According to some embodiments, a system is provided. The system may comprise a communication interface and a management system. The communication interface can be configured to receive data containing a replicated truncation point associated with a replicating system via a data path. The management system can be configured to determine that the received truncation point represents the point at which all data in a transaction log has been replicated and can truncate the transaction log at the received truncation point.

According to some embodiments, the communication interface may be further configured to receive data containing an additional replication truncation point associated with an additional replicating system via an additional data path. Additionally, the management system may be further configured to determine that the additional replicated truncation point represents the point at which all data in the transaction log has been replicated and truncate the transaction log at the additional replicated truncation point, according to some embodiments. These embodiments and more will be discussed in more detail with reference to FIGS. 1-6, below.

Figure 1:
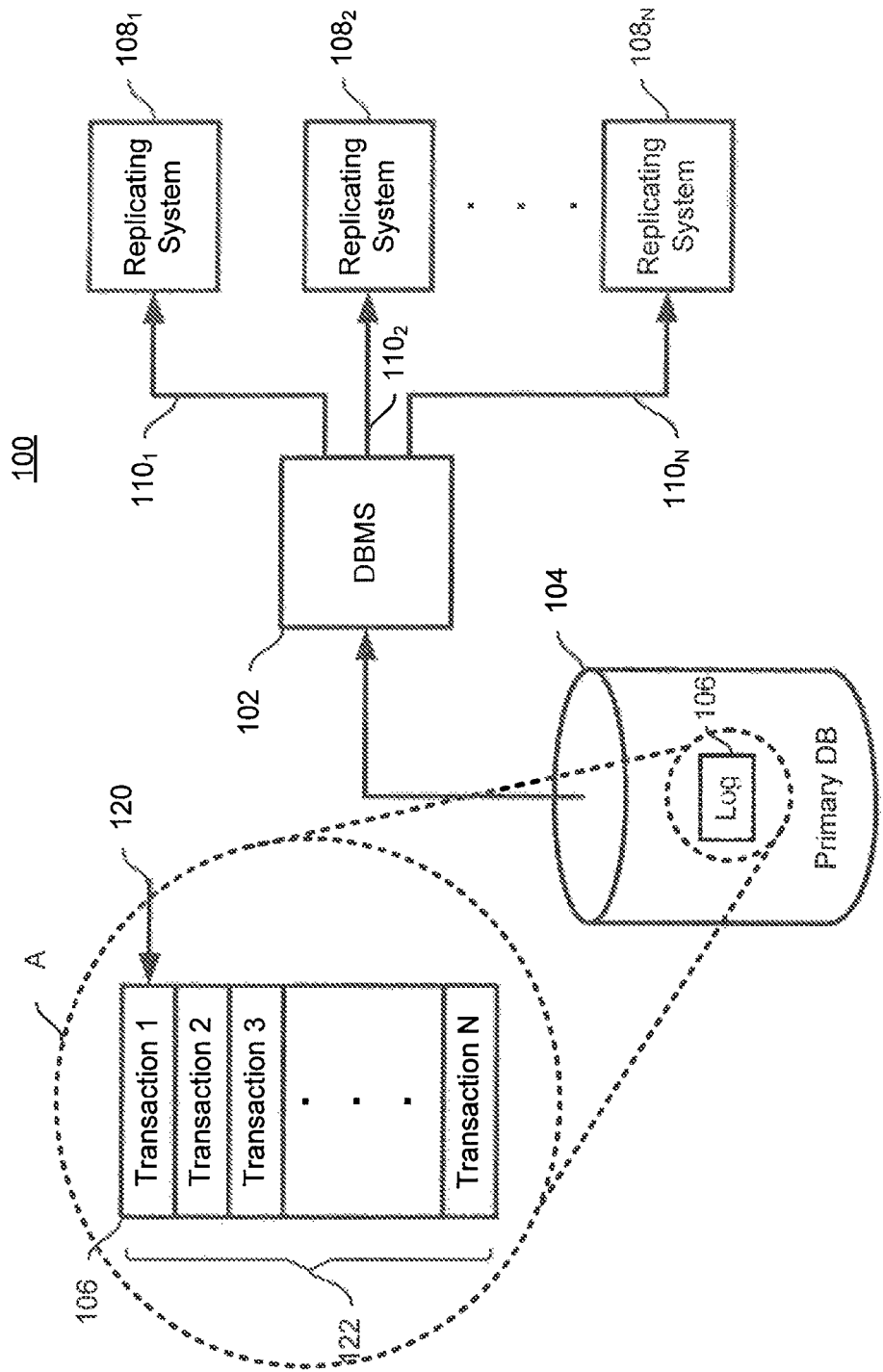
FIG. 1 is a functional block diagram depicting a replication system according to various example embodiments.

FIG. 1 is a functional block diagram depicting a database system 100 according to various embodiments. As shown, the database system 100 includes a database management system 102, a primary database 104, and a number of replicating systems 108$_1$, 108$_2$ . . . , 108$_N$ (collectively and/or generically referred to herein as "replicating systems 108"). The primary database may include, among other things, a transaction log 106 (shown enlarged in inset A) that is configured to store data relating to changes made to the database. For instance, the transaction log 106 may contain a record of changes made by database transactions (e.g., writes or deletes) that need to be replicated to one or more target or replicate databases (not shown) via replicating systems 108. Each of the replicating systems 108 may comprise computer servers responsible for replicating data to one or more of the target databases.

The database management system 102 may comprise any appropriate database management system. For instance, according to some embodiments, the database management system comprises a relational database management system. The database management system 102 is connected to the replicating systems 108 via a number of communication paths $110_1, 110_2, \ldots, 110_N$ (collectively and/or generically referred to herein as paths 110). Additionally, the database management system 102 is communicatively coupled to the primary database 104 via communication path 112.

As noted previously, replication from the primary database 104 can be achieved using the database management system 102. Specifically, the database management system 102 can read log records stored on the transaction log 106 and distribute the logged data to the target or replicate database(s) via replicating systems 108.

According to various embodiments, the transaction log 106 may include a number of transactions 122 (depicted as transaction 1, transaction 2, ..., transaction N, etc., in FIG. 1) and a truncation point 120. A truncation point according to various embodiments can represent an offset in the transaction log up to which the transaction log can safely be truncated or deleted. For instance, if none of the transactions 122 has been safely replicated to replicating systems 108 by the database management system 102, then the truncation point 102, might be set to transaction 1, as is shown in FIG. 1. However, if transaction 1 is successfully sent to the replicating systems 108, then the truncation point 120 can be moved to transaction 2 and the data pertaining to transaction 1 can be truncated or deleted from transaction log 106.

Figure 2:
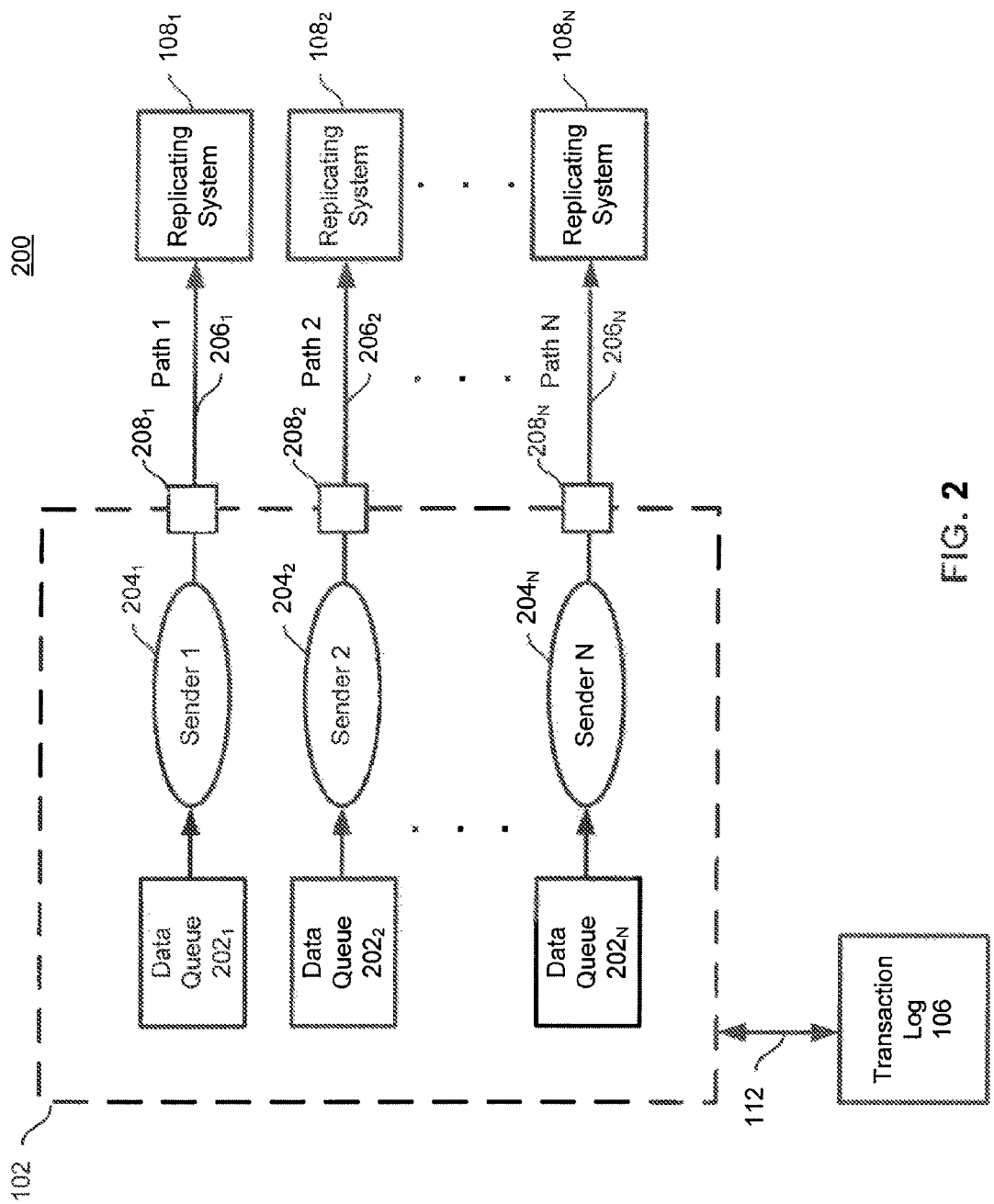
FIG. 2 is a functional block diagram depicting a database management system according to various example embodiments.

FIG. 2 depicts a view of the replication system 200 similar to replication system 100, however having more detail concerning the database management system 102. As shown, the database management system 102 includes data queues $202_1, 202_2, \ldots, 202_N$ (collectively and/or generically "data queues 202") and sender threads $204_1, 204_2, \ldots, 204_N$ (collectively and/or generically "sender threads 204"). Each of the sender threads is coupled to an associated data path 110 via a communication interface $208_1, 208_2, \ldots, 208_N$ (collectively and/or generically "communication interface 208"). In this way, the sender threads 204 can transmit a log data stream $206_1, 206_2, \ldots, 206_N$ to the replicating systems 108.

Each of the sender threads 204 is also associated with one of the data queues 202. The sender threads 204 can read from their associated data queues 202, which have been populated with data specifically for a target data source associated with the path for the associated sender 204. As shown, the data queues 202 are depicted as separate for each sender 204. However, according to various embodiments, data queues $202_1, 202_2, \ldots, 202_N$ could comprise a single queue that is shared by the various sender threads 204. This might be appropriate in systems where, for instance, all data is always replicated to all destinations.

According to various embodiments, the database management system 102 can read the transaction log 106 of the primary database 104 and process qualifying log records (e.g., transactions 122). These records can then be distributed towards the replicating system(s) 108 for replication to the target database(s).

Figure 3:
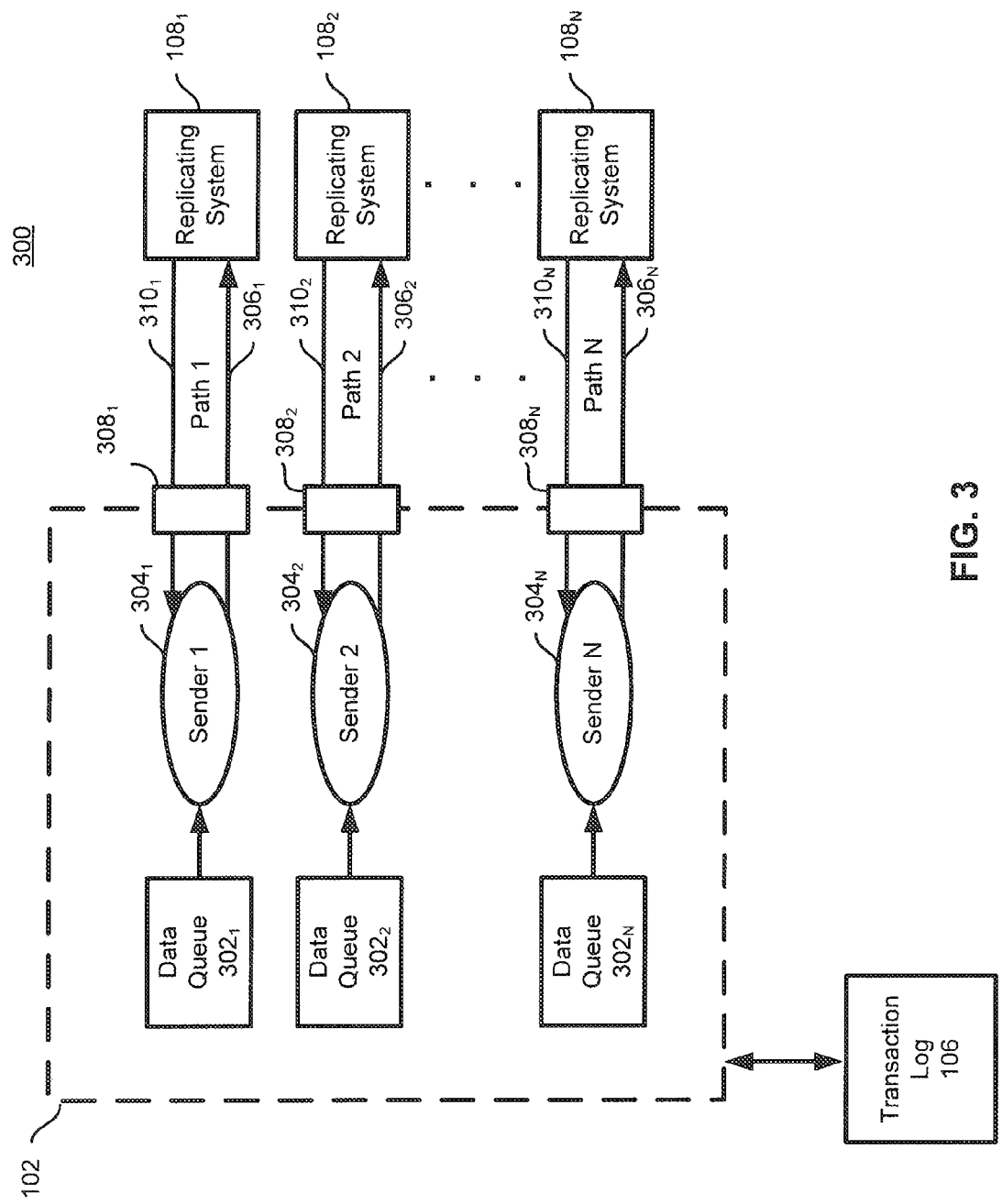
FIG. 3 is a functional block diagram depicting a database management system according to various example embodiments.

FIG. 3 is a functional block diagram depicting a replication system 300 similar to replication systems 100 and 200. Like system 200, system 300 includes database management system 102 having data queues $302_1, 302_2, \ldots, 302_1$ (collectively and/or generically "data queues 302") and sender threads $304_1, 304_2, \ldots, 304_N$ (collectively and/or generically "sender threads 304"). Each of the sender threads is coupled to an associated data path 110 via a communication interface $308_1, 308_2, \ldots, 308_N$ (collectively and/or generically "communication interface 208"). In this way, the sender threads 204 can transmit a log data stream $306_1, 306_2, \ldots, 306_N$ to the replicating systems 108. System 300, however, also includes data streams $310_1, 310_2, \ldots, 310_N$, which transmit data from the replicating systems 108 to the sender threads 304.

When data is correctly and successfully replicated by the replicating systems 108, the database transaction log 106 can be truncated to free space. The truncation can be executed when all logged image records up to a point (the truncation point 120) are correctly replicated to the target databases.

To accomplish this, each of the replication systems 108 communicates back for each path 110 an indication of the point up to which data is stored in the replicating system 108. For instance, as shown in FIG. 3, each replicating system 108 can send data containing an identifier that indicates a replicated truncation point along the associated data stream 308. The identifier or replicated truncation point represents an offset in the primary transaction log of the database indicating that up to this point the data has already successfully distributed to the target database associated with that replicating system 108.

According to various embodiments, when one of the senders 304 sends log data to one of the replicating systems 108 via data stream 306 it includes log data and an identifier indicating the location of the sent log data in the transaction log 106 of the database 104. Additionally, the replicating system can return an identifier that indicates the point to which data has been successfully replicated at the replicating system 108 in response to a command. This process is illustrated in FIG. 4

Figure 4:
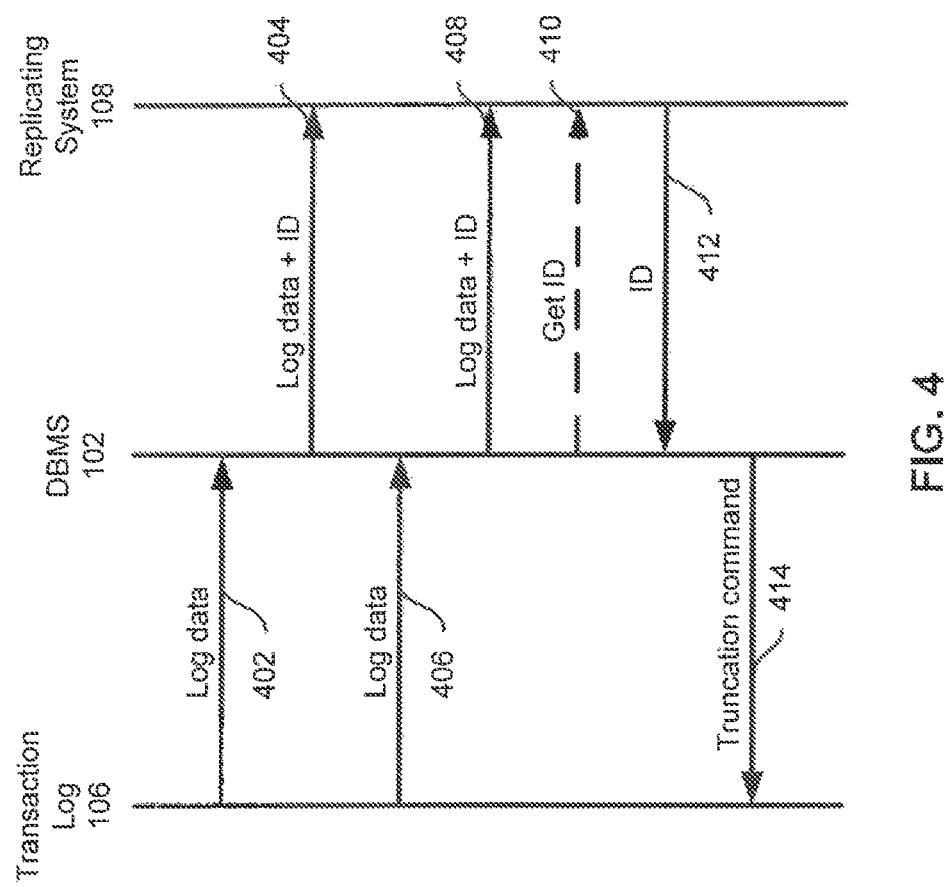
FIG. 4 is a message sequence diagram depicting messages sent in the replication system according to various example embodiments.

FIG. 4 is a message sequence diagram indicating data flow between several entities in system 300. As shown, the transaction log 106 sends log data to the database management system 102 as message 402. According to some embodiments, the database management system 102 may first send a command to the transaction log 106 asking for the log data.

Once the database management system 102 receives message 402 containing the log data from the transaction log 106, it can then load the log data into the appropriate data queue 302 for the appropriate sender thread 304. The sender thread 304 can then send the log data and an associated identifier to the appropriate replicating system 108 via the associated path 110 in message 404. As previously indicated, the identifier indicates the location of the log data being sent to the replicating system 108 in the transaction log 106. This process may be repeated a number of times. For instance, following message 404, the DBMS 102 may request additional log data from the transaction log 106, which can be sent to the database management system 102 as message 406. Again, the appropriate sender thread 304 can send the log data and an associated identifier to the appropriate replicating system 108 via the associated path 110 in message 408.

At a regular intervals the sender thread will request to the replication system 108 to send back the identifier if the last message received. This is done by, for instance, sending a command such as "Get ID" as message 410. This command will cause the replicating system 108 to which it was sent to return an identifier indicating the point to which data has been successfully replicated at the replicating system 108. As shown in FIG. 4, the identifier is sent as message 412. When the database management system 102 receives the identifier from the replicating system 108, it can determine whether the identifier represents the point up to which all data in the transaction log 106 has been replicated. If so, the database management system 102 can send a truncation command as message 414, causing the fully replicated data to be truncated and the truncation point 120 to be moved. The question becomes, however, how to determine whether the identifier received by the database management system 102 from the replicating system 108 represents the point up to which all data in the transaction log 106 has been replicated to all the paths.

There are several issues with replicating data among several paths 110 to the several replicating systems 108. First, the paths do not necessarily distribute the data at the same pace. Accordingly, data that is distributed across multiple paths does not necessarily arrive at the same time at the replicating systems 108 or at the target databases. Truncating the transaction log 106 based on the identifier returned by the fastest path 110 could result in the truncation of data that has yet to be sent or arrive at the associated replicating system 108.

Second, it is possible that a path 110 does not need to distribute data for a certain amount of time. In such case, while other paths 110 are receiving confirmation from the data distributed, the path without activity still needs to receive acknowledgements during its inactive period.

Third, data replicated to multiple paths may result in multiple identifiers (maybe indicating the same point in the transaction log and maybe not) to be received at the same time in parallel.

It is, therefore, necessary for the database management system 102 to institute a system of parallel transaction log 106 truncation management. This can be accomplished by applying some basic rules, including:

Only moving the truncation point 120 after the replicating systems 108 send back identifiers acknowledging the data processed so far;

The "oldest" identifier from a set of received identifiers (e.g., the set comprising the identifiers received from replicating systems $108_1$, $108_2$, ..., $108_N$) is the safest point in transaction log 106 of the primary database 104 that can be truncated;

The sender threads 304 may send a message with a valid identifier, representing non-existing data that is recognized by the external replicating system.

Stated differently, a specific message or command can be sent to the replicating system 108 together with an identifier at certain intervals even when a particular sender (e.g., sender $304_1$) has no specific data to send at that particular time. This specific command and, for instance, represents the last log record read from the primary transaction log 106 and may not need to be distributed. In this way, each path 110 is always receives an acknowledgement from its replicating system 108 even if the path 110 does not need to distribute data. This mechanism allows moving the truncation point in the primary database even when there are paths 110 that do not receive any data from the transaction log 106.

According to some embodiments, an in-memory synchronization point is used to store the latest identifier received for each path 110. The sender-thread 304 for each path is responsible for this storage. This identifier can then be used to move the truncation point 120 in the primary database 104. When moved, the truncation point 122 of the transaction log 106 is stored on disk. By taking the oldest identifier at any moment in time, we assure that the truncation point 120 in the transaction log 106 is correctly moved without the risk of losing data. An embodiment of this concept is illustrated in FIG. 5.

Figure 5:
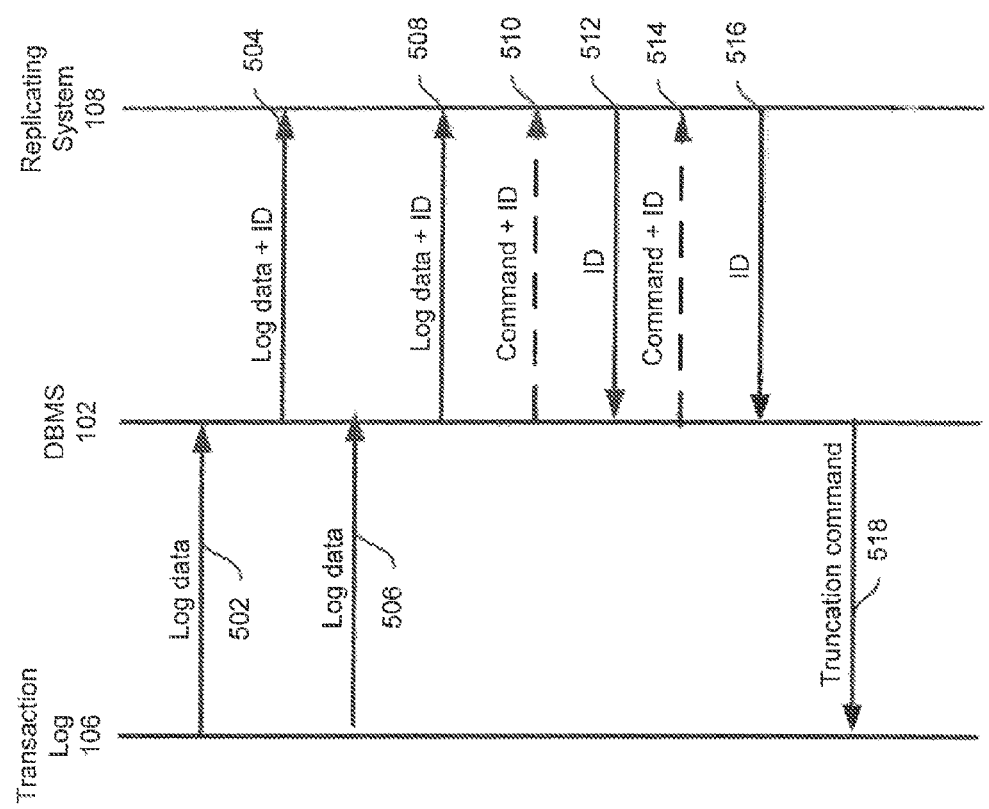
FIG. 5 is a message sequence diagram depicting messages sent in the replication system according to various example embodiments.

FIG. 5 is a message sequence diagram indicating data flow between several entities in system 300. As shown, the data management system 102 can access the transaction log 106 and cause the transaction log 106 to generates message 502, which contains log data.

Once the database management system 102 receives message 502 containing the log data from the transaction log 106, it can then load the log data into the appropriate data queue 302 for the appropriate sender thread 304. The sender thread 304 can then send the log data and an associated identifier to the appropriate replicating system 108 via the associated path 110 in message 504. As previously indicated, the identifier indicates the location of the log data being sent to the replicating system 108 in the transaction log 106. Again, this process can be repeated several times. For instance, the database management system 102 may access the transaction log 106 a second time causing it to generate message 506 also containing log data. The log data from message 506 can then be sent, along with an associated identifier, to the replicating system 108 as message 508.

Periodically, the database management system 102 (or, rather, the sender thread 304 of the database management system 102 according to some embodiments) may send a command plus an identifier to the replicating system 108 asking the replicating system to send back an identifier message. This message is depicted as message 510 in FIG. 5. In response to receiving the command message 510, the replicating system 108 sends back an identifier as message 512. Again, this identifier indicates the point to which data has been successfully replicated at the replicating system 108. The database management system 102 receives the identifier from the replicating system 108 and can determine whether the identifier represents the point up to which all data in the transaction log 106 has been replicated (i.e., whether it is the "safe" point to truncate the transaction log 106). Here (as opposed to the sequence depicted in FIG. 4), the database management system does not determine that the identifier represents the point up to which all data in the transaction log 106 has been replicated. For instance, the database management system 102 might determine that the identifier sent in message 512 is not the oldest according to some embodiments.

After determining that the identifier sent in message 512 is not the "safe" truncation point, the database management system 102 can send another message 510 to the replicating system 108. This message 514 may contain a command and an identifier that indicates the last log record read from the primary transaction log 106. According to some embodiments, the database management system 102 may wait a predetermined amount of time before sending message 514. Upon receipt of message 5514, the replicating system 108 will send back message 516 containing an identifier indicating the point to which data has been successfully replicated at the replicating system 108. Again, the database management system can determine whether the identifier represents the "safe" truncation point in the transaction log 106. According to various embodiments, the database management system 102 may continue to periodically send commands to the replicating system 108 at predetermined intervals until such time that it determines that the truncation point 120 should be moved. When that occurs, it can send message 518 to the transaction log 106 and/or the primary database 104 with a truncation command.

Figure 6:
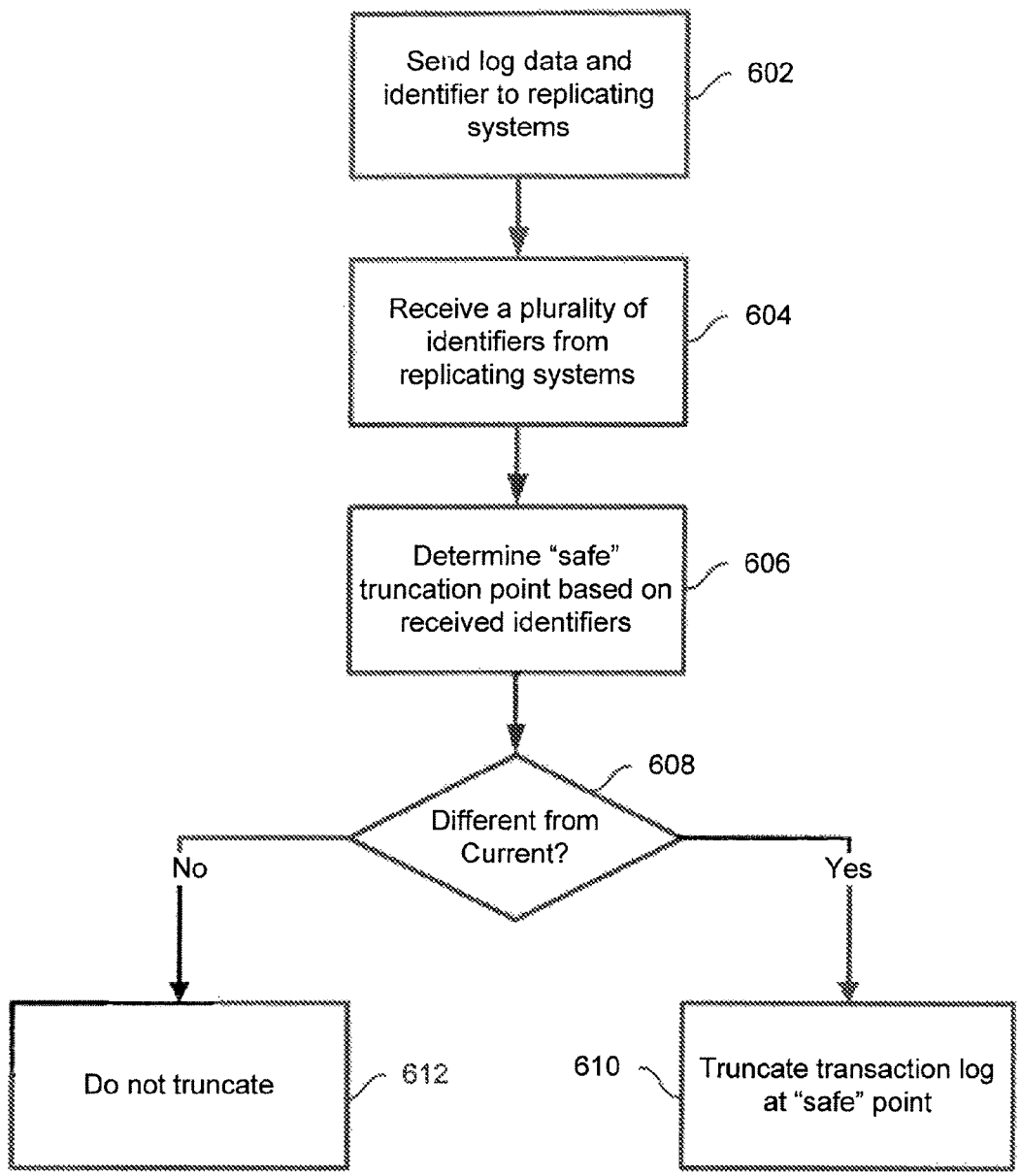
FIG. 6 is a flowchart depicting a method of replication according to various example embodiments.

FIG. 6 is a flowchart representing a process 600 for replicating data along multiple paths 110 in a replication system 100 according to various embodiments. For ease of explanation, this chart will be described with respect to the embodiments shown in FIGS. 1-5, but the process 600 need not be limited to these specific embodiments. As shown in FIG. 6, the method 600 begins by sending log data and an identifier to one or more replicating systems 108 along one or more corresponding paths 110 at step 602.

At step 604, plurality of identifiers are received from the replicating systems 108 via their associated paths 110. The identifiers indicate the point up to which data has been replicated in the replicating systems 108 corresponding to the received identifiers.

At step 606, the method 600 determines the "safe" truncation point for the transaction log 106 based on the identifiers received from the replicating systems 108. For instance, according to some embodiments, the safe truncation point is deemed to be the truncation point corresponding to the oldest identifier.

At step 608, the process 600 determines if the safe truncation point is different from the current truncation point 120. If it is, then the truncation point 120 is moved the transaction log 106 is truncated at the new truncation point. If it is not different, then the truncation log 106 is not truncated at step 612.

Figure 7:
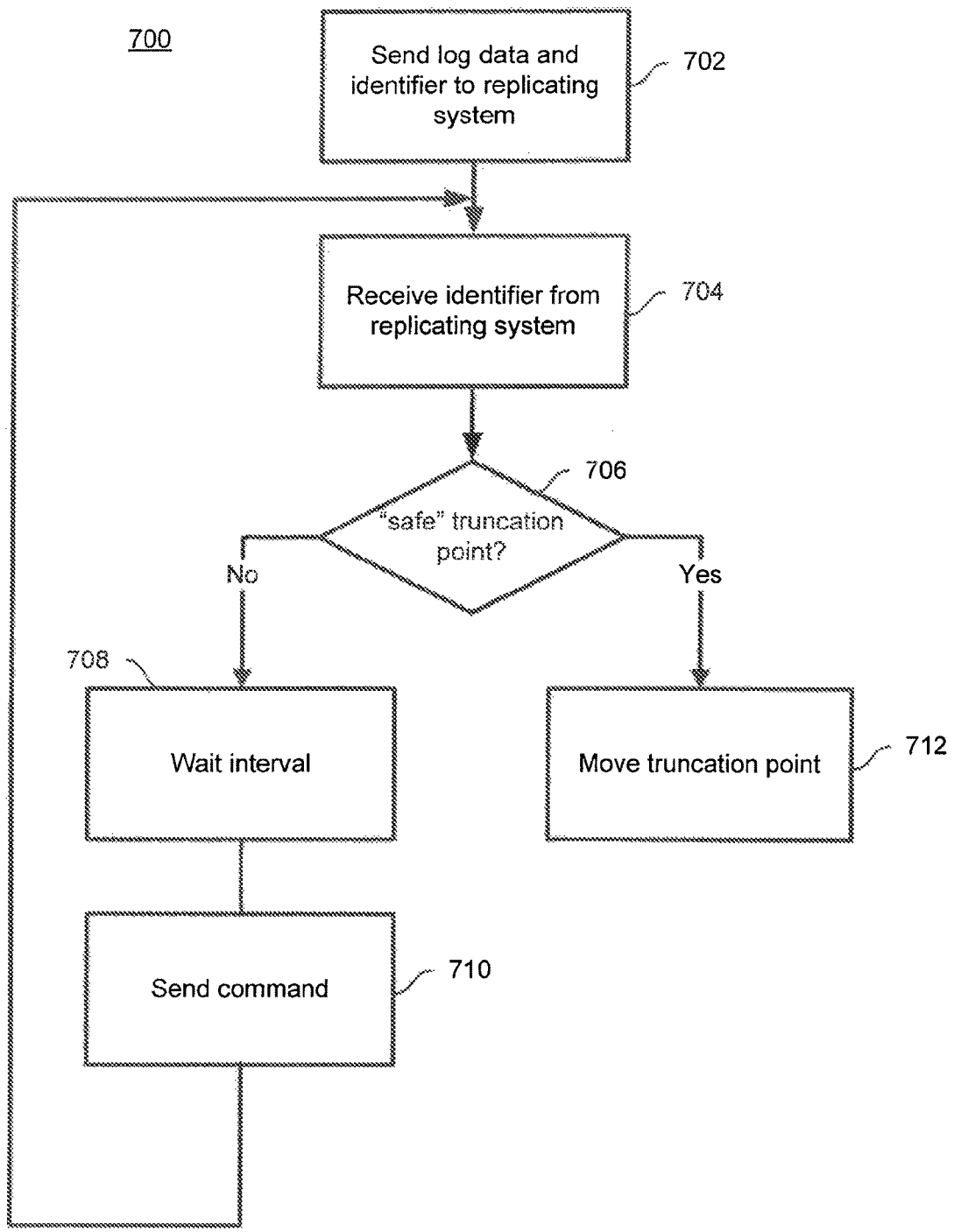
FIG. 7 is a flowchart depicting a method of replication according to various example embodiments.
Figure 8:
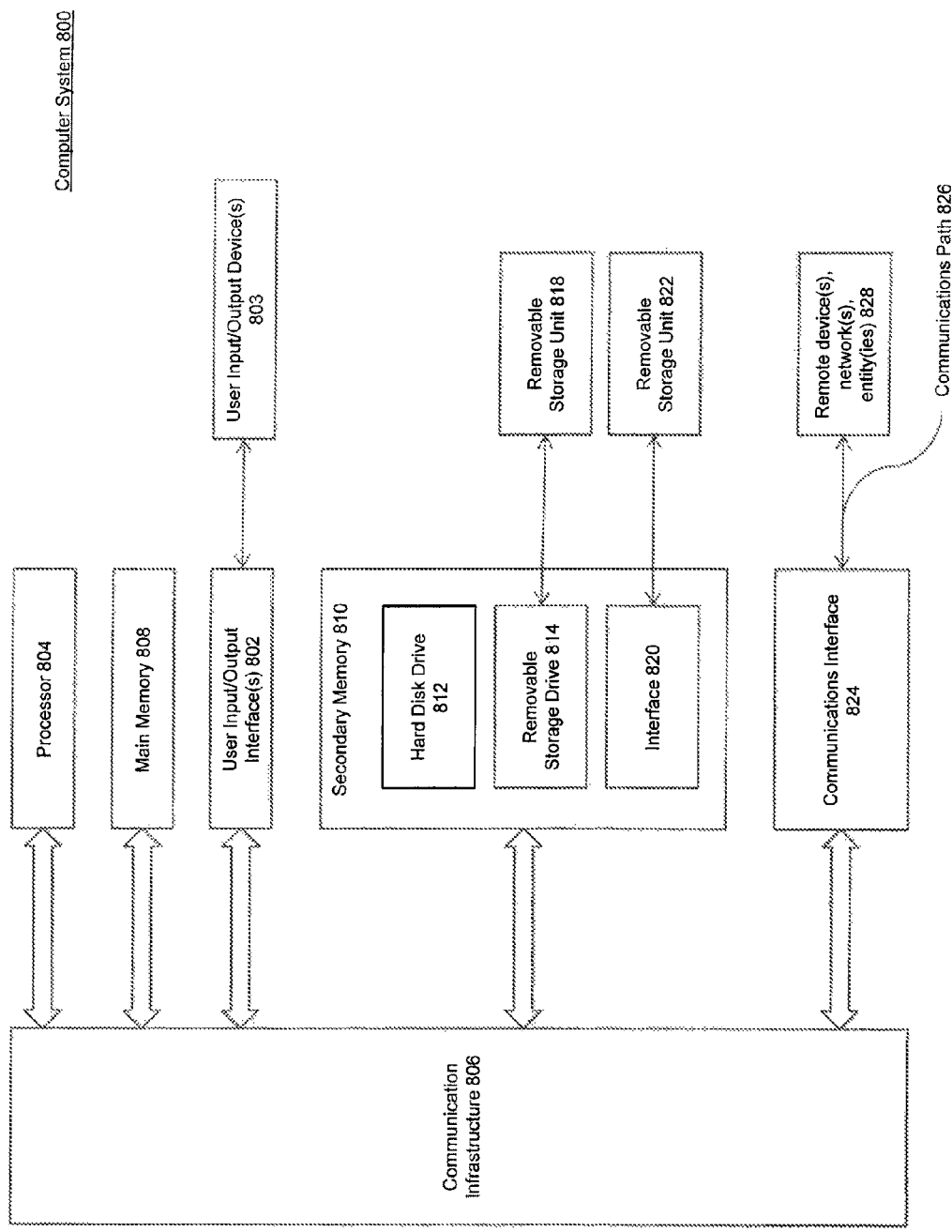
FIG. 8 is a functional block diagram of a computer system according to various example embodiments.

FIG. 7 is a flowchart depicting a process 700 that a sender thread 304 might follow according to various embodiments. As shown, process 700 begins at step 702 with the sender thread 304 sending log data and an identifier representing the location of the log data in the transaction log 106 to the replicating system 108 associated with the path 110 of the sender thread 304.

At step 704, the sender thread receives an identifier from the replicating system. The identifier indicates the point up to which data has been replicated in the replicating system 108. At step 706, the process 700 determines whether the identifier received from the replicating system 108 corresponds to the "safe" truncation point. If the identifier does correspond to the "safe" truncation point, then the process directs the sender thread 304 to move the truncation point 120 at step 712. According to various embodiments, the truncation point 120 may be configured such that only a single sender thread 304 may move it at a time.

If, at step 706, it is determined that the received identifier from the replicating system 108 does not correspond to a "save" truncation point, then an predetermined interval is waited at step 708. After the interval waited at step 708, a command is sent to the replicating system 108 at step 710. The process then loops back to step 704 where another identifier is received from the replicating system 108.

Example Computer System

Various embodiments can be implemented, for example, using one or more well-known computer systems, such as computer system 800 shown in FIG. 7. Computer system 800 can be any well-known computer capable of performing the functions described herein, such as computers available from International Business Machines, Apple, Sun, HP, Dell, Sony, Toshiba, etc.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 800 also includes user input/output device(s) 803, such as monitors, keyboards, pointing devices, etc., which communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use the contemplated embodiments using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the scope of the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of invention should not be limited by any of the above-described exemplary embodiments, but should be defined only in accordance with the following claims and their equivalents.

What is claimed is:

1. A method, comprising:
    sending, by a plurality of sender threads, a request for truncation points to a plurality of replicating systems, wherein each of the plurality of replicating systems is associated with a corresponding sender thread of the plurality of sender threads;
    receiving, by the plurality of sender threads and in response to the sent request, data containing a plurality of replicated truncation points associated with the plurality of replicating systems via a plurality of data paths;
    selecting a safe point from among the plurality of received replicated truncation points, the safe point representing a point at which all data in a transaction log has been replicated by the plurality of replicating systems; and
    truncating the transaction log at the determined safe point.

2. The method of claim 1, comprising:
    receiving data containing an additional replicated truncation point associated with an additional replicating system via an additional one of the plurality of data paths;
    determining that the additional replicated truncation point represents the point at which all data in the transaction log has been replicated; and
    truncating the transaction log at the additional replicated truncation point.

3. The method of claim 1, further comprising:
    sending data to a replicating system, wherein the data comprises transaction log data and an identifier indicating the point in the transaction log where the transaction log data ends.

4. The method of claim 3, wherein the data containing the replicated truncation point is received in response to sending the data to the replicating system.

5. The method of claim 4, wherein the replicated truncation point is configured to identify a point in the transaction log up to which all data has been replicated to the replicating system.

6. The method of claim 1, further comprising:
    sending a request to a replicating system for an updated replication truncation point.

7. The method of claim 6, further comprising:
    periodically repeating the request to the replicating system.

8. The method of claim 1, further comprising:
    storing the plurality of replicated truncation points in a memory.

9. The method of claim 1, further comprising:
    sending a command to one of the plurality replicating systems instructing it to update its associated replicated truncation point.

10. The method of claim 1, wherein selecting the safe point from among the plurality of received replicated truncation points comprises selecting an oldest of the plurality of received replicated truncation points.

11. The method of claim 1, wherein each of the plurality of sender threads is associated with one of a plurality of data paths.

12. The method of claim 11, wherein each of the plurality of replicating systems is associated with one of the plurality of data paths.

13. A system, comprising:
    a communication interface communicatively coupled to a plurality of data paths; and
    one or more processors communicatively coupled to the communication interface and configured to:
        send, using a plurality of sender threads, a request for truncation points to a plurality of replicating systems, wherein each of the plurality of replicating systems is associated with a corresponding sender thread of the plurality of sender threads, and
        receive, in response to the sent request, data containing a plurality of replicated truncation points associated with the plurality of replicating systems via the plurality of data paths;

select a safe point from among the plurality of received replicated truncation points, the safe point representing a point at which all data in a transaction log has been replicated by the plurality of replicating systems; and truncate the transaction log at the determined safe point.

14. The system of claim 13, wherein the one or more processors are further configured to receive data containing an additional replicated truncation point associated with an additional replicating system via one of the plurality of data paths.

15. The system of claim 14, wherein the one or more processors are further configured to:
determine that the additional replicated truncation point represents the point at which all data in the transaction log has been replicated; and
truncate the transaction log at the additional replicated truncation point.

16. The system of claim 13, wherein the one or more processors are further configured to send, via the communication interface, data to the replicating system, wherein the data comprises transaction log data and an identifier indicating the point in the transaction log where the transaction log data ends.

17. The system of claim 13, wherein the one or more processors are further configured to identify a point in the transaction log up to which all data has been replicated to the replicating system based on the replicated truncation point.

18. The system of claim 13, wherein the one or more processors are further configured to determine that one of the plurality of received replicated truncation points represents the safe point by determining that the received truncation point is the oldest truncation point.

19. The system of claim 13, wherein the communication interface is further configured to send a request to a replicating system for an updated replication truncation point.

20. The system of claim 19, wherein the communication interface is configured to periodically repeat the request to the replicating system.

21. The system of claim 13, wherein the communication interface is further configured to send a command to one of the plurality of replicating systems instructing it to update its associated replicated truncation point.

22. A non-transitory computer readable medium having computer instructions stored thereon that, when executed by one or more processors, cause those processors to perform operations, comprising:
sending, by a plurality of sender threads, a request for truncation points to a plurality of replicating systems, wherein each of the plurality of replicating systems is associated with a corresponding sender thread of the plurality of sender threads;
receiving, by the plurality of sender threads and in response to the sent request, data containing a plurality of replicated truncation points associated with the plurality of replicating systems via a plurality of data paths;
selecting a safe point from among the plurality of received replicated truncation points, the safe point representing a point at which all data in a transaction log has been replicated by the plurality of replicating systems; and
truncating the transaction log at the determined safe point.

* * * * *